(12) United States Patent
Goel

(10) Patent No.: US 8,941,464 B2
(45) Date of Patent: Jan. 27, 2015

(54) AUTHORIZATION SYSTEM AND A METHOD OF AUTHORIZATION

(75) Inventor: Parveen Kumar Goel, Epping (AU)

(73) Assignee: Honeywell International Inc., Morristown, NJ (US)

(*) Notice: Subject to any disclaimer, the term of this patent is extended or adjusted under 35 U.S.C. 154(b) by 125 days.

(21) Appl. No.: 13/533,334

(22) Filed: Jun. 26, 2012

(65) Prior Publication Data

US 2012/0326868 A1 Dec. 27, 2012

Related U.S. Application Data

(63) Continuation of application No. 12/090,915, filed as application No. PCT/AU2006/001574 on Oct. 23, 2006, now Pat. No. 8,232,860.

(30) Foreign Application Priority Data

Oct. 21, 2005 (AU) ................................ 2005905856

(51) Int. Cl.
*H04B 5/00* (2006.01)
*H04B 7/00* (2006.01)
(Continued)

(52) U.S. Cl.
CPC .............. *H04L 9/3234* (2013.01); *G06F 21/35* (2013.01); *G06F 21/74* (2013.01); *G06F 21/83* (2013.01); *G07C 9/00103* (2013.01); *G07C 9/00309* (2013.01); *G07C 9/00571* (2013.01);
(Continued)

(58) Field of Classification Search
None
See application file for complete search history.

(56) References Cited

U.S. PATENT DOCUMENTS

| 3,753,232 A | 8/1973 | Sporer |
| 3,806,911 A | 4/1974 | Pripusich |

(Continued)

FOREIGN PATENT DOCUMENTS

| CA | 2240881 | 12/1999 |
| CN | 1265762 | 9/2000 |

(Continued)

OTHER PUBLICATIONS

"Certificate Validation Choices," CoreStreet, Inc., 8 pages, 2002.
(Continued)

*Primary Examiner* — George Bugg
*Assistant Examiner* — Renee Dorsey
(74) *Attorney, Agent, or Firm* — Seager Tufte & Wickhem LLC.

(57) ABSTRACT

An access control system for a secure facility includes an authorization system having an interface, in the form of an interrogator, for receiving the request signal indicative of a user seeking authorization for a predetermined action, such as gaining access through a door. In one example, an authorization system may include an interface for receiving a request signal indicative of a party seeking authorization for a predetermined action. A first processor, that is responsive to the request signal, determines if the authorization is to be granted. If so, the first processor may generate an authorization signal that includes information that is securely coded, and which is indicative of the determination. An operating device, physically spaced from the first processor, may receive the authorization signal, and may decode the securely coded information and subsequently initiating the action, if appropriate.

20 Claims, 2 Drawing Sheets

(51) Int. Cl.
   *G05B 19/00* (2006.01)
   *H04L 9/32* (2006.01)
   *G06F 21/35* (2013.01)
   *G06F 21/74* (2013.01)
   *G06F 21/83* (2013.01)
   *G07C 9/00* (2006.01)
   *H04L 29/06* (2006.01)

(52) U.S. Cl.
   CPC ...... *H04L63/10* (2013.01); *G07C 2009/00793* (2013.01); *G07C 2209/62* (2013.01); *H04L 63/0428* (2013.01); *H04L 63/0853* (2013.01); *H04L 2209/805* (2013.01)
   USPC ............ 340/5.2; 340/5.6; 455/41.1; 455/41.2

(56) References Cited

U.S. PATENT DOCUMENTS

| | | | |
|---|---|---|---|
| 3,857,018 A | 12/1974 | Stark et al. | |
| 3,860,911 A | 1/1975 | Hinman et al. | |
| 3,866,173 A | 2/1975 | Moorman et al. | |
| 3,906,447 A | 9/1975 | Crafton | |
| 4,095,739 A | 6/1978 | Fox et al. | |
| 4,146,085 A | 3/1979 | Wills | |
| 4,148,012 A | 4/1979 | Baump et al. | |
| 4,161,778 A | 7/1979 | Getson, Jr. et al. | |
| 4,213,118 A | 7/1980 | Genest et al. | |
| 4,283,710 A | 8/1981 | Genest et al. | |
| 4,298,946 A | 11/1981 | Hartsell et al. | |
| 4,332,852 A | 6/1982 | Korklan et al. | |
| 4,336,902 A | 6/1982 | Neal | |
| 4,337,893 A | 7/1982 | Flanders et al. | |
| 4,353,064 A | 10/1982 | Stamm | |
| 4,373,664 A | 2/1983 | Barker et al. | |
| 4,379,483 A | 4/1983 | Farley | |
| 4,462,028 A | 7/1984 | Ryan et al. | |
| 4,525,777 A | 6/1985 | Webster et al. | |
| 4,538,056 A | 8/1985 | Young et al. | |
| 4,556,169 A | 12/1985 | Zervos | |
| 4,628,201 A | 12/1986 | Schmitt | |
| 4,646,964 A | 3/1987 | Parker et al. | |
| 4,685,615 A | 8/1987 | Hart | |
| 4,821,177 A | 4/1989 | Koegel et al. | |
| 4,847,839 A | 7/1989 | Hudson, Jr. et al. | |
| 5,070,468 A | 12/1991 | Niinomi et al. | |
| 5,071,065 A | 12/1991 | Aalto et al. | |
| 5,099,420 A | 3/1992 | Barlow et al. | |
| 5,172,565 A | 12/1992 | Wruck et al. | |
| 5,204,663 A | 4/1993 | Lee | |
| 5,227,122 A | 7/1993 | Scarola et al. | |
| 5,259,553 A | 11/1993 | Shyu | |
| 5,271,453 A | 12/1993 | Yoshida et al. | |
| 5,361,982 A | 11/1994 | Liebl et al. | |
| 5,404,934 A | 4/1995 | Carlson et al. | |
| 5,420,927 A | 5/1995 | Micali | |
| 5,449,112 A | 9/1995 | Heitman et al. | |
| 5,465,082 A | 11/1995 | Chaco | |
| 5,479,154 A | 12/1995 | Wolfram | |
| 5,481,481 A | 1/1996 | Frey et al. | |
| 5,526,871 A | 6/1996 | Musser et al. | |
| 5,541,585 A | 7/1996 | Duhame et al. | |
| 5,591,950 A | 1/1997 | Imedio-Ocana | |
| 5,594,429 A | 1/1997 | Nakahara | |
| 5,604,804 A | 2/1997 | Micali | |
| 5,610,982 A | 3/1997 | Micali | |
| 5,631,825 A | 5/1997 | van Weele et al. | |
| 5,640,151 A | 6/1997 | Reis et al. | |
| 5,644,302 A | 7/1997 | Hana et al. | |
| 5,663,957 A | 9/1997 | Dent | |
| 5,666,416 A | 9/1997 | Micali | |
| 5,717,757 A | 2/1998 | Micali | |
| 5,717,758 A | 2/1998 | Micali | |
| 5,717,759 A | 2/1998 | Micali | |
| 5,732,691 A | 3/1998 | Maiello et al. | |
| 5,774,058 A | 6/1998 | Henry et al. | |
| 5,778,256 A | 7/1998 | Darbee | |
| 5,793,868 A | 8/1998 | Micali | |
| 5,914,875 A | 6/1999 | Monta et al. | |
| 5,915,473 A | 6/1999 | Ganesh et al. | |
| 5,923,817 A | 7/1999 | Nakamura | |
| 5,927,398 A | 7/1999 | Maciulewicz | |
| 5,930,773 A | 7/1999 | Crooks et al. | |
| 5,960,083 A | 9/1999 | Micali | |
| 5,973,613 A | 10/1999 | Reis et al. | |
| 5,992,194 A | 11/1999 | Baukholt et al. | |
| 6,072,402 A | 6/2000 | Kniffin et al. | |
| 6,097,811 A | 8/2000 | Micali | |
| 6,104,963 A | 8/2000 | Cebasek et al. | |
| 6,119,125 A | 9/2000 | Gloudeman et al. | |
| 6,141,595 A | 10/2000 | Gloudeman et al. | |
| 6,149,065 A | 11/2000 | White et al. | |
| 6,154,681 A | 11/2000 | Drees et al. | |
| 6,167,316 A | 12/2000 | Gloudeman et al. | |
| 6,233,954 B1 | 5/2001 | Mehaffey et al. | |
| 6,241,156 B1 | 6/2001 | Kline et al. | |
| 6,249,755 B1 | 6/2001 | Yemini et al. | |
| 6,260,765 B1 | 7/2001 | Natale et al. | |
| 6,268,797 B1 * | 7/2001 | Berube et al. ............... 340/573.1 |
| 6,292,893 B1 | 9/2001 | Micali | |
| 6,301,659 B1 | 10/2001 | Micali | |
| 6,318,137 B1 | 11/2001 | Chaum | |
| 6,324,854 B1 | 12/2001 | Jayanth | |
| 6,334,121 B1 | 12/2001 | Primeaux et al. | |
| 6,347,374 B1 | 2/2002 | Drake et al. | |
| 6,366,558 B1 | 4/2002 | Howes et al. | |
| 6,369,719 B1 | 4/2002 | Tracy et al. | |
| 6,374,356 B1 | 4/2002 | Daigneault et al. | |
| 6,393,848 B2 | 5/2002 | Roh et al. | |
| 6,394,359 B1 | 5/2002 | Morgan | |
| 6,424,068 B2 | 7/2002 | Nakagishi | |
| 6,453,426 B1 | 9/2002 | Gamache et al. | |
| 6,453,687 B2 | 9/2002 | Sharood et al. | |
| 6,483,697 B1 | 11/2002 | Jenks et al. | |
| 6,487,658 B1 | 11/2002 | Micali | |
| 6,490,610 B1 | 12/2002 | Rizvi et al. | |
| 6,496,575 B1 | 12/2002 | Vasell et al. | |
| 6,516,357 B1 | 2/2003 | Hamann et al. | |
| 6,518,953 B1 | 2/2003 | Armstrong | |
| 6,546,419 B1 | 4/2003 | Humpleman et al. | |
| 6,556,899 B1 | 4/2003 | Harvey et al. | |
| 6,574,537 B2 | 6/2003 | Kipersztok et al. | |
| 6,583,712 B1 | 6/2003 | Reed et al. | |
| 6,604,023 B1 | 8/2003 | Brown et al. | |
| 6,615,594 B2 | 9/2003 | Jayanth et al. | |
| 6,628,997 B1 | 9/2003 | Fox et al. | |
| 6,647,317 B2 | 11/2003 | Takai et al. | |
| 6,647,400 B1 | 11/2003 | Moran | |
| 6,658,373 B2 | 12/2003 | Rossi et al. | |
| 6,663,010 B2 | 12/2003 | Chene et al. | |
| 6,665,669 B2 | 12/2003 | Han et al. | |
| 6,667,690 B2 | 12/2003 | Durej et al. | |
| 6,741,915 B2 | 5/2004 | Poth | |
| 6,758,051 B2 | 7/2004 | Jayanth et al. | |
| 6,766,450 B2 | 7/2004 | Micali | |
| 6,789,739 B2 | 9/2004 | Rosen | |
| 6,796,494 B1 | 9/2004 | Gonzalo | |
| 6,801,849 B2 | 10/2004 | Szukala et al. | |
| 6,801,907 B1 | 10/2004 | Zagami | |
| 6,826,454 B2 | 11/2004 | Sulfstede | |
| 6,829,332 B2 | 12/2004 | Farris et al. | |
| 6,851,621 B1 | 2/2005 | Wacker et al. | |
| 6,871,193 B1 | 3/2005 | Campbell et al. | |
| 6,886,742 B2 | 5/2005 | Stoutenburg et al. | |
| 6,895,215 B2 | 5/2005 | Uhlmann | |
| 6,910,135 B1 | 6/2005 | Grainger | |
| 6,967,612 B1 | 11/2005 | Gorman et al. | |
| 6,969,542 B2 | 11/2005 | Klasen-Memmer et al. | |
| 6,970,070 B2 | 11/2005 | Juels et al. | |
| 6,973,410 B2 | 12/2005 | Seigel | |
| 6,983,889 B2 | 1/2006 | Alles | |
| 6,989,742 B2 | 1/2006 | Ueno et al. | |
| 7,004,401 B2 | 2/2006 | Kallestad | |
| 7,019,614 B2 | 3/2006 | Lavelle et al. | |
| 7,032,114 B1 | 4/2006 | Moran | |

(56) References Cited

U.S. PATENT DOCUMENTS

| | | |
|---|---|---|
| 7,055,759 B2 | 6/2006 | Wacker et al. |
| 7,124,943 B2 | 10/2006 | Quan et al. |
| 7,130,719 B2 | 10/2006 | Ehlers et al. |
| 7,183,894 B2 | 2/2007 | Yui et al. |
| 7,203,962 B1 | 4/2007 | Moran |
| 7,205,882 B2 | 4/2007 | Libin |
| 7,216,007 B2 | 5/2007 | Johnson |
| 7,216,015 B2 | 5/2007 | Poth |
| 7,218,243 B2 | 5/2007 | Hayes et al. |
| 7,222,800 B2 | 5/2007 | Wruck |
| 7,233,243 B2 | 6/2007 | Roche et al. |
| 7,243,001 B2 | 7/2007 | Janert et al. |
| 7,245,223 B2 | 7/2007 | Trela |
| 7,250,853 B2 | 7/2007 | Flynn |
| 7,274,676 B2 | 9/2007 | Cardei et al. |
| 7,283,489 B2 | 10/2007 | Palaez et al. |
| 7,313,819 B2 | 12/2007 | Burnett et al. |
| 7,321,784 B2 | 1/2008 | Serceki et al. |
| 7,337,315 B2 | 2/2008 | Micali |
| 7,343,265 B2 | 3/2008 | Andarawis et al. |
| 7,353,396 B2 | 4/2008 | Micali et al. |
| 7,362,210 B2 | 4/2008 | Bazakos et al. |
| 7,376,839 B2 | 5/2008 | Carta et al. |
| 7,379,997 B2 | 5/2008 | Ehlers et al. |
| 7,380,125 B2 | 5/2008 | Di Luoffo et al. |
| 7,383,158 B2 | 6/2008 | Krocker et al. |
| 7,397,371 B2 | 7/2008 | Martin et al. |
| 7,408,925 B1 | 8/2008 | Boyle et al. |
| 7,487,538 B2 | 2/2009 | Mok |
| 7,505,914 B2 | 3/2009 | McCall |
| 7,542,867 B2 | 6/2009 | Steger et al. |
| 7,543,327 B1 | 6/2009 | Kaplinsky |
| 7,574,734 B2 | 8/2009 | Fedronic et al. |
| 7,576,770 B2 | 8/2009 | Metzger et al. |
| 7,583,401 B2 | 9/2009 | Lewis |
| 7,586,398 B2 | 9/2009 | Huang et al. |
| 7,600,679 B2 | 10/2009 | Kshirsagar et al. |
| 7,634,662 B2 | 12/2009 | Monroe |
| 7,661,603 B2 | 2/2010 | Yoon et al. |
| 7,683,940 B2 | 3/2010 | Fleming |
| 7,735,145 B2 | 6/2010 | Kuehnel et al. |
| 7,794,536 B2 | 9/2010 | Teshima et al. |
| 7,801,870 B2 | 9/2010 | Oh et al. |
| 7,818,026 B2 | 10/2010 | Hartikainen et al. |
| 7,839,926 B1 | 11/2010 | Metzger et al. |
| 7,853,987 B2 | 12/2010 | Balasubramanian et al. |
| 7,861,314 B2 | 12/2010 | Serani et al. |
| 7,873,441 B2 | 1/2011 | Synesiou et al. |
| 7,907,753 B2 | 3/2011 | Wilson et al. |
| 7,937,669 B2 | 5/2011 | Zhang et al. |
| 7,983,892 B2 | 7/2011 | Anne et al. |
| 7,995,526 B2 | 8/2011 | Liu et al. |
| 7,999,847 B2 | 8/2011 | Donovan et al. |
| 8,045,960 B2 | 10/2011 | Orakkan |
| 8,069,144 B2 | 11/2011 | Quinlan et al. |
| 8,089,341 B2 | 1/2012 | Nakagawa et al. |
| 8,095,889 B2 | 1/2012 | DeBlaey et al. |
| 8,166,532 B2 * | 4/2012 | Chowdhury et al. ............. 726/9 |
| 8,199,196 B2 | 6/2012 | Klein et al. |
| 8,316,407 B2 | 11/2012 | Lee et al. |
| 8,474,029 B2 | 6/2013 | Adams et al. |
| 8,509,987 B2 | 8/2013 | Resner |
| 8,560,970 B2 | 10/2013 | Liddington |
| 8,605,151 B2 | 12/2013 | Bellamy et al. |
| 2002/0011923 A1 | 1/2002 | Cunningham et al. |
| 2002/0022991 A1 | 2/2002 | Sharood et al. |
| 2002/0046337 A1 | 4/2002 | Micali |
| 2002/0118096 A1 | 8/2002 | Hoyos et al. |
| 2002/0121961 A1 | 9/2002 | Huff |
| 2002/0165824 A1 | 11/2002 | Micali |
| 2002/0170064 A1 | 11/2002 | Monroe et al. |
| 2003/0033230 A1 | 2/2003 | McCall |
| 2003/0071714 A1* | 4/2003 | Bayer et al. ............. 340/5.2 |
| 2003/0174049 A1 | 9/2003 | Beigel et al. |
| 2003/0208689 A1 | 11/2003 | Garza |
| 2003/0218534 A1* | 11/2003 | LaCous ........................ 340/5.83 |
| 2003/0233432 A1 | 12/2003 | Davis et al. |
| 2004/0062421 A1 | 4/2004 | Jakubowski et al. |
| 2004/0064453 A1 | 4/2004 | Ruiz et al. |
| 2004/0068583 A1 | 4/2004 | Monroe et al. |
| 2004/0087362 A1 | 5/2004 | Beavers |
| 2004/0114779 A1* | 6/2004 | Blazey ........................ 382/100 |
| 2004/0205350 A1 | 10/2004 | Waterhouse et al. |
| 2005/0138380 A1 | 6/2005 | Fedronic et al. |
| 2005/0200714 A1 | 9/2005 | Marchese |
| 2006/0017939 A1* | 1/2006 | Jamieson et al. ............. 356/622 |
| 2006/0059557 A1 | 3/2006 | Markham et al. |
| 2007/0028118 A1* | 2/2007 | Brown et al. ................. 713/185 |
| 2007/0109098 A1 | 5/2007 | Siemon et al. |
| 2007/0132550 A1 | 6/2007 | Avraham et al. |
| 2007/0171862 A1 | 7/2007 | Tang et al. |
| 2007/0268145 A1 | 11/2007 | Bazakos et al. |
| 2007/0272744 A1 | 11/2007 | Bantwal et al. |
| 2008/0086758 A1 | 4/2008 | Chowdhury et al. |
| 2008/0173709 A1 | 7/2008 | Ghosh |
| 2008/0272881 A1 | 11/2008 | Goel |
| 2009/0018900 A1 | 1/2009 | Waldron et al. |
| 2009/0080443 A1 | 3/2009 | Dziadosz |
| 2009/0086692 A1 | 4/2009 | Chen |
| 2009/0097815 A1 | 4/2009 | Lahr et al. |
| 2009/0121830 A1 | 5/2009 | Dziadosz |
| 2009/0167485 A1 | 7/2009 | Birchbauer et al. |
| 2009/0168695 A1 | 7/2009 | Johar et al. |
| 2009/0258643 A1 | 10/2009 | McGuffin |
| 2009/0266885 A1 | 10/2009 | Marcinowski et al. |
| 2009/0292524 A1 | 11/2009 | Anne et al. |
| 2009/0292995 A1 | 11/2009 | Anne et al. |
| 2009/0292996 A1 | 11/2009 | Anne et al. |
| 2009/0328152 A1 | 12/2009 | Thomas et al. |
| 2009/0328203 A1 | 12/2009 | Haas |
| 2010/0026811 A1 | 2/2010 | Palmer |
| 2010/0036511 A1 | 2/2010 | Dongare |
| 2010/0148918 A1 | 6/2010 | Gerner et al. |
| 2010/0164720 A1 | 7/2010 | Kore |
| 2010/0220715 A1 | 9/2010 | Cherchali et al. |
| 2010/0269173 A1 | 10/2010 | Srinivasa et al. |
| 2011/0038278 A1 | 2/2011 | Bhandari et al. |
| 2011/0043631 A1 | 2/2011 | Marman et al. |
| 2011/0071929 A1 | 3/2011 | Morrison |
| 2011/0115602 A1 | 5/2011 | Bhandari et al. |
| 2011/0133884 A1 | 6/2011 | Kumar et al. |
| 2011/0153791 A1 | 6/2011 | Jones et al. |
| 2011/0167488 A1 | 7/2011 | Roy et al. |
| 2011/0181414 A1 | 7/2011 | G et al. |
| 2012/0096131 A1 | 4/2012 | Bhandari et al. |
| 2012/0106915 A1 | 5/2012 | Palmer |
| 2012/0121229 A1 | 5/2012 | Lee |
| 2012/0133482 A1 | 5/2012 | Bhandari et al. |

FOREIGN PATENT DOCUMENTS

| | | |
|---|---|---|
| DE | 19945861 | 3/2001 |
| EP | 0043270 | 1/1982 |
| EP | 0122244 | 10/1984 |
| EP | 0152678 | 8/1985 |
| EP | 0629940 | 12/1994 |
| EP | 0858702 | 4/2002 |
| EP | 1339028 | 8/2003 |
| EP | 1630639 | 3/2006 |
| EP | 1549020 B1 | 4/2012 |
| GB | 2251266 | 7/1992 |
| GB | 2390705 | 1/2004 |
| JP | 6019911 | 1/1994 |
| JP | 2003/074942 | 3/2003 |
| JP | 2003/240318 | 8/2003 |
| WO | WO 84/02786 | 7/1984 |
| WO | WO 94/19912 | 9/1994 |
| WO | WO 96/27858 | 9/1996 |
| WO | WO 00/11592 | 3/2000 |
| WO | WO 00/76220 | 12/2000 |
| WO | WO 01/42598 | 6/2001 |
| WO | WO 01/57489 | 8/2001 |
| WO | WO 01/60024 | 8/2001 |
| WO | WO 02/32045 | 4/2002 |

(56) References Cited

FOREIGN PATENT DOCUMENTS

| WO | 0235479 A1 | 5/2002 |
|---|---|---|
| WO | WO 02/091311 | 11/2002 |
| WO | 02100040 A1 | 12/2002 |
| WO | WO 03/090000 | 10/2003 |
| WO | WO 2004/092514 | 10/2004 |
| WO | WO 2005/038727 | 4/2005 |
| WO | WO 2006/021047 | 3/2006 |
| WO | WO 2006/049181 | 5/2006 |
| WO | WO 2006/126974 | 11/2006 |
| WO | WO 2007/043798 | 4/2007 |
| WO | WO 2008/045918 | 4/2008 |
| WO | WO 2008/144803 | 12/2008 |

OTHER PUBLICATIONS

"CoreStreet Cuts the PKI Gordian Knot," Digital ID World, pp. 22-25, Jun./Jul. 2004.
"Distributed Certificate Validation," CoreStreet, Ltd., 17 pages, 2006.
"Identity Services Infrastructure," CoreStreet Solutions—Whitepaper, 12 pages, 2006.
"Important FIPS 201 Deployment Considerations," Corestreet Ltd.—Whitepaper, 11 pages, 2005.
"Introduction to Validation for Federated PKI," Corestreet Ltd, 20 pages, 2006.
"Keyfast Technical Overview", Corestreet Ltd., 21 pages, 2004.
"Manageable Secure Physical Access," Corestreet Ltd, 3 pages, 2002.
"MiniCRL, Corestreet Technology Datasheet," CoreStreet, 1 page, 2006.
"Nonce Sense, Freshness and Security in OCSP Responses," Corestreet Ltd, 2 pages, 2003.
"Real Time Credential Validation, Secure, Efficient Permissions Management," Corestreet Ltd, 5 pages, 2002.
"The Role of Practical Validation for Homeland Security," Corestreet Ltd, 3 pages, 2002.
"The Roles of Authentication, Authorization & Cryptography in Expanding Security Industry Technology," Security Industry Association (SIA), Quarterly Technical Update, 32 pages, Dec. 2005.
"Vulnerability Analysis of Certificate Validation Systems," Corestreet Ltd—Whitepaper, 14 pages, 2006.
Goldman et al., "Information Modeling for Intrusion Report Aggregation," IEEE, Proceedings DARPA Information Survivability Conference and Exposition II, pp. 329-342, 2001.
Honeywell, "Excel Building Supervisor-Integrated R7044 and FS90 Ver. 2.0," Operator Manual, 70 pages, Apr. 1995.
http://www.tcsbasys.com/products/superstats.asp, TCS/Basys Controls: Where Buildings Connect With Business, 2 pages, printed Aug. 26, 2003.
http://www.tcsbasys.com/products/sz1009.asp, TCS/Basys Controls: Where Buildings Connect With Business, 1 page, printed Aug. 26, 2003.
http://www.tcsbasys.com/products/sz1017a.asp, TCS/Basys Controls: Where Buildings Connect With Business, 1 page, printed Aug. 26, 2003.
http://www.tcsbasys.com/products/sz1017n.asp, TCS/Basys Controls: Where Buildings Connect With Business, 1 page, printed Aug. 26, 2003.
http://www.tcsbasys.com/products/sz1020nseries.asp, TCS/Basys Controls: Where Buildings Connect With Business, 2 pages, printed Aug. 26, 2003.
http://www.tcsbasys.com/products/sz1020series.asp, TCS/Basys Controls: Where Buildings Connect With Business, 2 pages, printed Aug. 26, 2003.
http://www.tcsbasys.com/products/sz1022.asp, TCS/Basys Controls: Where Buildings Connect With Business, 2 pages, printed Aug. 26, 2003.
http://www.tcsbasys.com/products/sz1024.asp, TCS/Basys Controls: Where Buildings Connect With Business, 2 pages, printed Aug. 26, 2003.
http://www.tcsbasys.com/products/sz1030series.asp, TCS/Basys Controls: Where Buildings Connect With Business, 2 pages, printed Aug. 26, 2003.
http://www.tcsbasys.com/products/sz1033.asp, TCS/Basys Controls: Where Buildings Connect With Business, 2 pages, printed Aug. 26, 2003.
http://www.tcsbasys.com/products/sz1035.asp, TCS/Basys Controls: Where Buildings Connect With Business, 2 pages, printed Aug. 26, 2003.
http://www.tcsbasys.com/products/sz1041.asp, TCS/Basys Controls: Where Buildings Connect With Business, 1 page, printed Aug. 26, 2003.
http://www.tcsbasys.com/products/sz1050series.asp, TCS/Basys Controls: Where Buildings Connect With Business, 2 pages, printed Aug. 26, 2003.
http://www.tcsbasys.com/products/sz1051.asp, TCS/Basys Controls: Where Buildings Connect With Business, 2 pages, printed Aug. 26, 2003.
http://www.tcsbasys.com/products/sz1053.asp, TCS/Basys Controls: Where Buildings Connect With Business, 2 pages, printed Aug. 26, 2003.
http://wwww.tcsbasys.com/products/sz1031.asp, TCS/Basys Controls: Where Buildings Connect With Business, 2 pages, printed Aug. 26, 2003.
Trane, "System Programming, Tracer Summit Version 14, BMTW-SVP01D-EN," 623 pages, 2002.
U.S. Appl. No. 14/129,086, filed Dec. 23, 2013.
International Search Report for Corresponding Application No. EP06790413 dated Jan. 2, 2014.

* cited by examiner

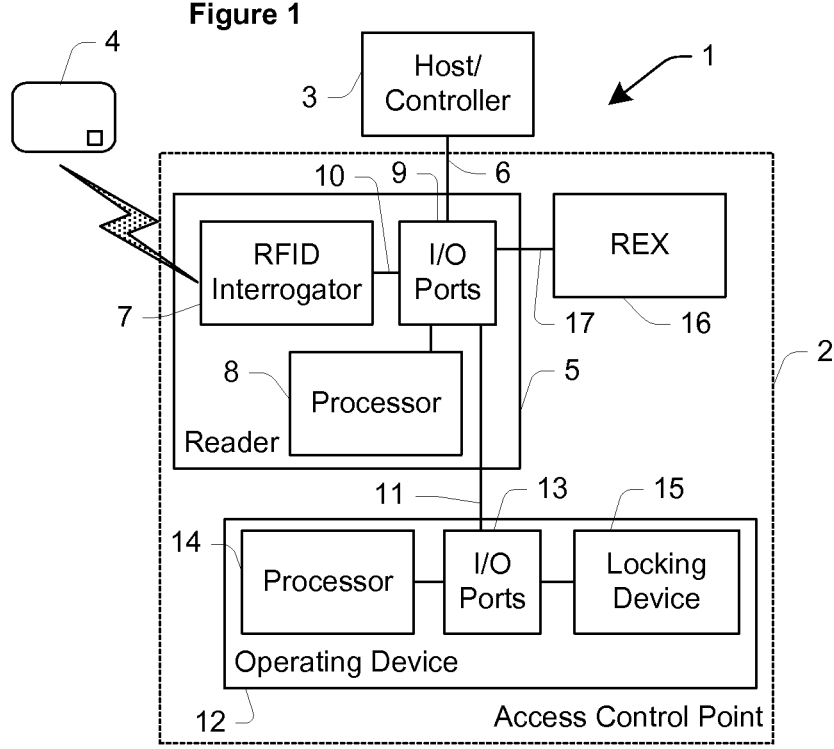
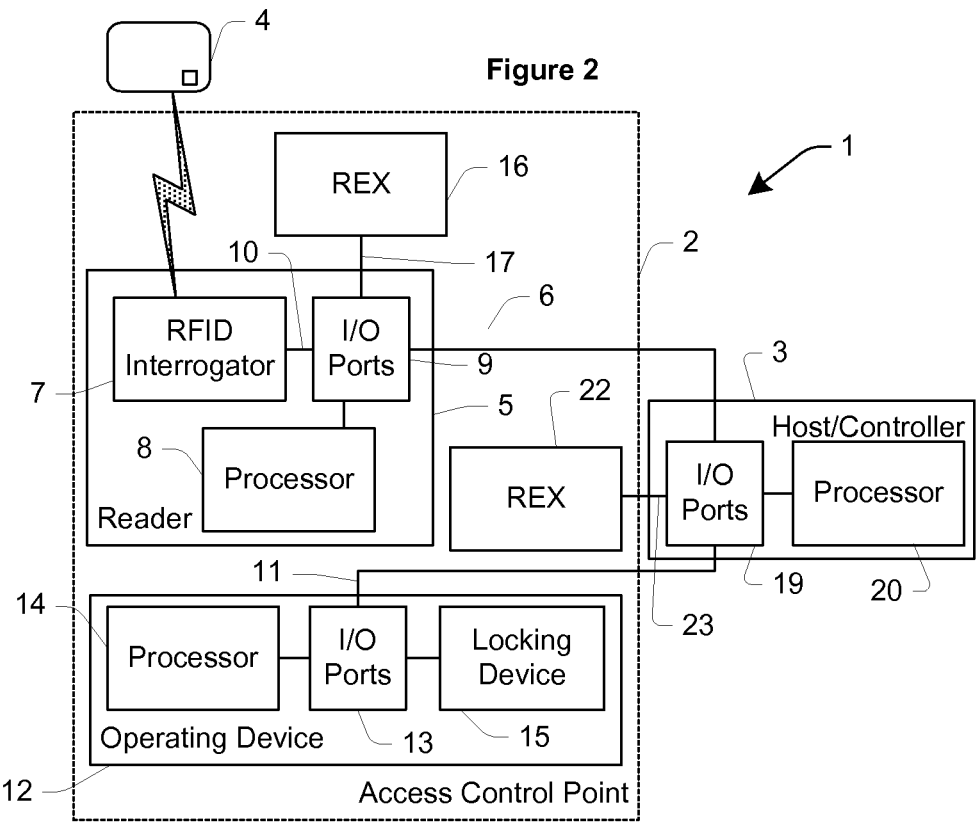

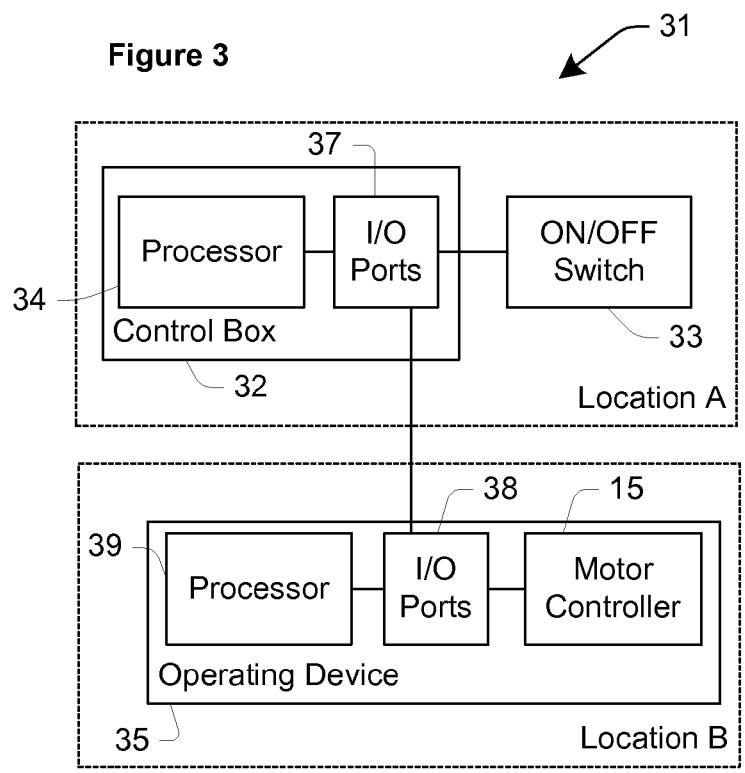
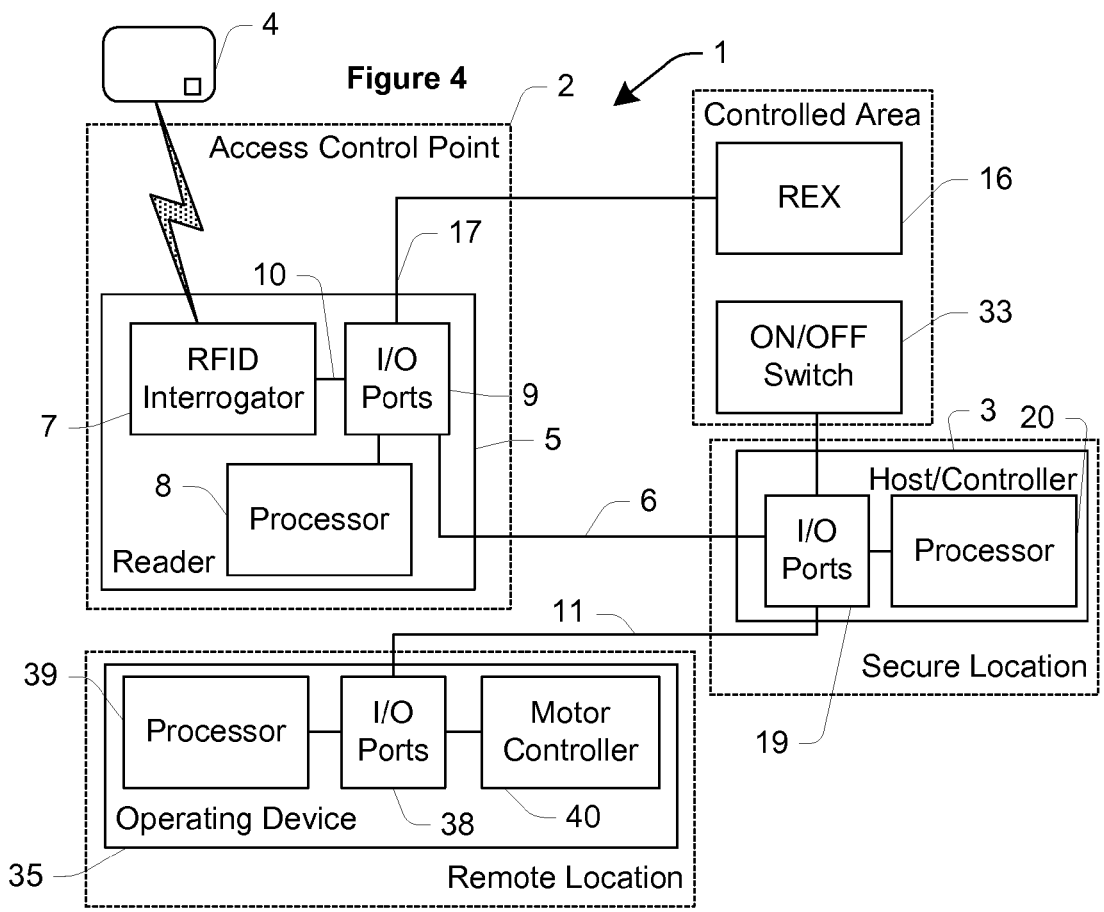

AUTHORIZATION SYSTEM AND A METHOD OF AUTHORIZATION

This application is a continuation of U.S. patent application Ser. No. 12/090,915, filed Apr. 21, 2008, which is a 371 of International Application No. PCT/AU2006/001574, filed Oct. 23, 2006, which claims priority to Australian Patent Application No. AU2005905856, all of which are incorporated hereby by reference.

FIELD OF THE INVENTION

The present invention relates to an authorization system and a method of authorization. The invention has been developed primarily for an access control system for a building and will be described hereinafter with reference to that application. The invention is not limited to that particular field of use and is also suitable to other controlled assets such as a facility, a piece of electrical equipment, a piece of electromechanical equipment, or the like.

DISCUSSION OF THE PRIOR ART

Access control systems are employed to control access by users to facilities, equipment and other assets. Typically, users are issued with respective tokens—for example, an RFID card—that contain data indicative of at least an identifier for the user. An example of such a system is disclosed in Patent Co-Operation Treaty Patent Application No. PCT/AU2005/001285 filed on 25 Aug. 2005. The disclosure within that application is incorporated herein by way of cross-reference.

It is known to use in access control systems protocols for the identification and the authentication of data read from the tokens to validate a request by a user for access to the controlled facility. The request typically takes the form of the card being interrogated by a reader that is co-located with the access point where access is being sought. If the request is validated, the reader provides an electrical signal to one or more physical devices—such as relay modules—to pulse the access point between a closed and an open configuration. Where the access point includes a door having a lock, the relay module drives the lock to allow the user to enter or exit from the access point, as the case may be.

It has been found that a sufficiently trained person trying to gain unauthorized entry into the facility at the access point is able to use external devices to directly mimic signals sent to the relay modules that drive the lock or locks and gain access to the facility without holding a valid permission to do so. Accordingly, the prior art systems are susceptible to abuse by unscrupulous or dishonest persons.

Any discussion of the prior art throughout the specification should in no way be considered as an admission that such prior art is widely known or forms part of common general knowledge in the field.

DESCRIPTION OF THE INVENTION

It is an object of the present invention to overcome or ameliorate at least one of the disadvantages of the prior art, or to provide a useful alternative.

According to a first aspect of the invention there is provided an authorization system including:
an interface for receiving a request signal indicative of a party seeking authorization for a predetermined action;
a first processor that is responsive to the request signal for determining if the authorization is to be granted and, if so, generating an authorization signal that includes information that is securely coded and which is indicative of the determination; and
an operating device being physically spaced apart from the first processor for receiving the authorization signal, the operating device having a second processor that is responsive to the authorization signal for decoding the information and subsequently initiating the action.

Preferably, the first processor generates the authorization signal in response to each request signal. Preferably also, the coding of the information is by way of encryption.

In an embodiment the authorization signal is part of a communication session between the first processor and the operating device. Preferably, the communications session is subject to a predetermined coding of the information. More preferably, different communications sessions use different predetermined coding of the information.

In an embodiment, if the authorization is not to be granted the first processor does not generate the authorization signal. However, in another embodiment, if the authorization is not to be granted the first processor generates the authorization signal to include information that is securely coded and which is indicative of the determination, and the second processor, upon decoding the information, does one or more of: not initiating the action; and generating an alarm signal.

According to a second aspect of the invention there is provided a method of authorization, the method including:
receiving a request signal indicative of a party seeking authorization for a predetermined action;
being responsive with a first processor to the request signal for determining if the authorization is to be granted and, if so, generating an authorization signal that includes information that is coded and which is indicative of the determination; and
physically spacing apart from the first processor an operating device for receiving the authorization signal, the operating device having a second processor that is responsive to the authorization signal for decoding the information and subsequently initiating the action.

According to a third aspect of the invention there is provided an authorization system including:
an interface for receiving a request signal indicative of a party seeking authorization for a predetermined action;
a processor that is responsive to the request signal for determining if the authorization is to be granted and, if so, generating a secure signal; and
an operating device being physically spaced apart from the processor and responsive to the secure signal for initiating the action.

Preferably, the signal contains at least one of: identification information for the party; and predetermined authorization information.

In an embodiment, the processor and the interface are co-located. Preferably, the processor and the interface are mounted to a common housing.

In an embodiment, the request signal includes an identification signal containing the identification information and an authorization signal containing the authorization information. In another embodiment, the request signal comprises the authorization information.

In an embodiment the system includes a central host that communicates with the interface, wherein the identification signal is provided by a token associated with the party and the authorization signal is provided by the central host. In other embodiments, the request signal includes only the identification information and is provided by the token. In alternative embodiments, the system includes an actuator that is responsive to the party for providing the request signal, wherein the request signal includes the authorization information.

In an embodiment the authorization system is an access control system for an access point, the interface is an access reader for the access point, the processor is included within the reader, and the operating device is a locking device for the access point. More preferably, the access point is a door. In other embodiments, however, the access point is a window, a vehicle ignition, or the like.

In an embodiment the access control system is for a plurality of spaced apart access points having respective combinations of reader, processor and operating device. Preferably, the system includes a central host for all the readers.

In an embodiment the processor and the operating device are configured for communication with each other in accordance with a predefined protocol. Preferably, the communication includes secure confirmed messages exchanged between the operating device and the processor. That is, communication occurs from the processor to the operating device, and vice versa. Preferably, the communication includes the secure signal. Preferably, for each message the receiving party provides acknowledgment of receipt.

More preferably, each secure signal constitutes a plurality of separate messages, and defines a session of messages. A plurality of messages is referred to as a session. Preferably, some sessions will provide security encoding information for a subsequent session or sessions. The key can be changed every message, periodically, or as often as one wants. That is, in these embodiments use is made of dynamic securing coding information. However, in other embodiments use is made of static or dynamic securing coding information. Static means that the encoding remains the same over multiple sessions.

According to a fourth aspect of the invention there is provided a method of authorization, the method including:

receiving a request signal indicative of a party seeking authorization for a predetermined action;

providing a processor that is responsive to the request signal for determining if the authorization is to be granted and, if so, generating a secure signal; and physically spacing apart from the processor an operating device that is responsive to the secure signal for initiating the action.

According to a fifth aspect of the invention there is provided an authorization system including:

an interface for receiving a request signal indicative of a party seeking authorization for a predetermined action, the interface and the party being disposed within a first zone;

a processor that is in or adjacent to the first zone and which is responsive to the request signal for determining if the authorization is to be granted and, if so, generating a secure signal; and an operating device that is disposed in a second zone that is physically distinct from the first zone, the operating device including a processor that is responsive to the secure signal for initiating the action.

Preferably, the predetermined action is to unlock an access point between the zones such that the party is able to progress from the first zone to the second zone.

In an embodiment, the second zone is disposed within the first zone. In other embodiments, the first zone and the second zone have a first level and a second level of security respectively, wherein the second level of security is greater than the first. That is, the second zone is secure relative to the first zone. For example, in one embodiment, the second zone defines the perimeter of a secure facility, and the first zone surrounds the secure facility. That is, the user, in progressing from the first zone to the second zone enters the secure facility.

According to a sixth aspect of the invention there is provided a method of authorization, the method including:

receiving with an interface a request signal that is indicative of a party seeking authorization for a predetermined action, the interface and the party being disposed within a first zone;

disposing a processor in or adjacent to the first zone and which is responsive to the request signal for determining if the authorization is to be granted and, if so, generating a secure signal; and an operating device that is disposed in a second zone that is physically distinct from the first zone, the operating device including a processor that is responsive to the secure signal for initiating the action.

According to a seventh aspect of the invention there is provided a reader for an authorization system having a set of components capable of securely coded communication with the reader, the reader including a first processor that establishes securely coded communication with a subset of the components and thereafter communicates only with the components in the subset and is excluded from communicating with the remainder of the components in the set.

Preferably, the processor is excluded from communicating with components not in the set.

In an embodiment, the components are selected from: a host for the authorization system; an operating device; a REX device; other hardware; and other hardware/software combinations.

In an embodiment the first processor generates keys that are provided to the subset of components and not provided to the remainder of the components. Preferably, the subset is defined by those components able to communicate with the reader at a predetermined time. More preferably, the predetermined time is at initialization of the reader.

In an embodiment the host is able to selectively communicate with the reader to vary the components included in the subset.

According to an eighth aspect of the invention there is provided a method for configuring a reader for an authorization system having a set of components capable of securely coded communication with the reader, the reader including a first processor that establishes securely coded communication with a subset of the components and thereafter communicates only with the components in the subset and is excluded from communicating with the remainder of the components in the set.

BRIEF DESCRIPTION OF THE DRAWINGS

Preferred embodiments of the invention will now be described by way of example only with reference to the accompanying drawings in which:

FIG. 1 is a schematic representation of an access control system for a controlled facility having an access reader for an access point, the access control system including an authorization system according to the invention;

FIG. 2 is a schematic representation of a further authorization system according to the invention where the operating device is communicated to by other than the reader;

FIG. 3 is a schematic representation of an authorization system according to the invention for a motor controller; and FIG. 4 is a schematic representation of the authorization system of FIG. 3 incorporated into the access control system of FIG. 2.

DESCRIPTION OF THE PREFERRED EMBODIMENTS

Referring to FIG. 1 there is illustrated schematically an access control system 1 for a secure facility (not shown). The secure facility is, in this embodiment, a building having a plurality of controlled access points, one of which is illustrated in FIG. 1 and designated as access control point 2. The facility is one of many spaced apart facilities that are controlled by the same access control system. In other embodiments, only a single facility is controlled by the access system.

Those persons (referred to collectively as "users" or individually as "a user") who are granted respective access rights to the facility are enrolled within system 1 by a central host 3. The central host is part of a larger computer network and typically includes at least one central server, one or more databases, at least one enrolment terminal, a network for allowing communication between these the components, and various other hardware and software to carry out the required operations and to interact with the remainder of the network. When describing the embodiments of the invention the component parts of the host will only be separately illustrated where the separate functions require elaboration, and will be otherwise generically referred to as including all the components. While host 3 is referred to as being a "central host" this is only in the sense of its control function, and does not necessarily refer to its location or other characteristics. That is, the central nature of host 3 is that it allows for the centralized control and administration of system 1.

For each user enrolled in system 1 there is held by host 3 a user record which is indicative of: the authorization provided to the user; the identity of that user; and other characteristics of the user that are required for the specific operation of system 1. The user record provides the necessary information for creating for that user identification information and authorization information that are respectively indicative of the identity of and the authorization provided to the user. The identification information and the authorization information are stored on an access token 4 that is issued to the user. That is, each user is issued with a respective token that is physically carried by the user and which is presented to initiate a request for access at the access points controlled by system 1. In other embodiments only one of the identification information and authorization information is stored on the tokens. It will be appreciated by those skilled in the art that the information carried on the token is different for different systems.

In this embodiment the identification information and the authorization information are encrypted on the token. In other embodiments alternative mechanisms are used to prevent unauthorized access to the information held on the tokens.

The tokens provide a request signal to an interface, as will be described in more detail below, to initiate an access control decision. In this embodiment tokens 4 are contactless smart cards making use of RFID communication. In other embodiments use is made of alternative tokens such as RFID cards not having onboard processing, magnetic strip cards, Bluetooth™ devices, or the like. In further embodiments, use is made of a combination of the above types of tokens. In still further embodiments, in addition to or instead of tokens, use is made of one or a combination of: a keypad (for example, to allow the user to enter a PIN or other code); a manually depressed button (such as a manual request to exit button); a motion sensor (to automatically detect the presence of a user adjacent to an "exit" access point); and other sensors. That is, the request signal is able to come from one, or a combination of sources.

System 1 includes a reader 5 that is associated with access point 2 and which communicates with both host 3 and token 4. In this embodiment reader 5 communicates periodically, intermittently or otherwise with host 3 via network cable 6 to locally store selected data for allowing the reader to make access control decisions for the access point. The communication between reader 5 and host 3 is in accordance with the network protocol being used. In this embodiment the network protocol does not use encryption for all communications between the reader and the host as the physical location of cable 6 minimizes the risk of unauthorized intercept or mimicking of the communications effected by that cable. Moreover, the communications between reader 5 and host 3 do not result in a command being sent to an operating device (such as a lock, which is described below). Accordingly, even if an unauthorized person were able to intercept the communications between the reader and the host, that would not directly or easily allow the production of a signal that would gain that person access.

In other embodiments, such as extremely high security facilities, use is made of additional measures such as encryption for those communications between reader 5 and the host 3.

Reader 5 communicates with token 4 when that token is placed within an interrogation field provided by the reader. As will be described in more detail below, the token is placed in the field such that the reader obtains from the token a request signal that is used subsequently to assist in the making of the access control decision. This access control decision, once made by reader 5, results in the generation of an authorization signal that contains information indicative of the decision and which is used by other components with system 1 to either grant or not grant access to the user who is seeking access at the access point. More particularly access point 2, in this instance, is a doorway and a corresponding door (not shown). The access control decision is whether or not the user who is disposed on one side of the door is entitled to be granted access, via the doorway, to the secure area disposed on the other side of the door at the time the request for access is made.

In this embodiment, reader 5 need not communicate with host 3 between obtaining the request signal and making the access control decision. That is, reader 5 is sufficiently self-contained to allow the making of the access control decision, which results in host 3 only being involved following receipt of the authorization signal. In other embodiments, however, reader 5 selectively communicates with the host prior to making the access control decision. In further embodiments, reader 5 always communicates with host 3 prior to making the access control decision. In further embodiments host 3 is able, in given circumstances, to override an access control decision made at a given reader.

Some embodiments include a controller (not shown) disposed between reader 5 and host 3 for affecting all communications between the reader and host. This controller performs that function for a subset of readers in system 1 and, as such, system 1 includes a number of these controllers. In these embodiments it is typical for the reader to communicate with the relevant controller prior to an access control decision being made.

Reader 5 includes: an RFID interrogator 7 for communicating wirelessly with token 4 to obtain the request signal; a processor 8 that is responsive to the request signal for making the access control decision; and a bank of I/O ports 9 for enabling communication between interrogator 7 and processor 8.

It will be appreciated that processor 8 includes at least one CPU, RAM and other memory for storing software and other data, and other hardware for allowing the required functionality to be performed.

The communication between reader 5 and host 3 occurs between processor 7 and host 3, albeit via one of ports 9.

Interrogator 7 is linked to one of ports 9 by electrical cable 10. In the embodiments of the invention disclosed in this specification it is usual for cable 10 to be relatively short in length. In some embodiments, interrogator 7 and processor 8 are mounted to a common circuit board and cable 10 is replaced by one or more conductive tracks on the board.

Interrogator 7 is contained within a sealed generally prismatic rigid plastics housing (not shown) that has a rear face that is mounted to a wall adjacent to the door. Interrogator 7 produces an interrogation field that extends outwardly from a front face of the housing, and it is this field into which token 4 is disposed by the respective user to initiate a request for access at access point 2. The wireless communication between token 4 and interrogator 7 includes the request signal—sent from token 4 to interrogator 7 in response to token 4 being interrogated—which is not encrypted. However, the identification and authorization information included within the request signal are encrypted. In other embodiments, the entirety of the communications between token 4 and interrogator 7 are encrypted, although this does require more processing power at token 4 and reader 5. In other embodiments, only portions of or selected ones of the communications are encrypted. In the latter case, it is preferred that the request signal is one of the selected communications.

The role of interrogator 7 is to receive the request signal from token 4. It will be appreciated that the request signal is extracted from the interrogation field by the interrogator and, in this embodiment, packaged in the appropriate format and communicated to one of ports 9 via cable 10. There is no need for any additional encryption or data security to be applied to the request signal by interrogator 7 as the relevant information within the request signal has already been encrypted. This also reduces the need for processing at the interrogator.

In this embodiment, processor 8 and ports 9 are also disposed within the housing. This obscures the housed components from view, as well as making them physically difficult to access without significantly and irreversibly damaging the housing. In some embodiments the housing includes tamper alarms that interact with processor 8 for informing host 3 if tampering is detected.

In another embodiment, processor 8 and ports 9 are disposed in a second sealed housing that is separate and physically spaced apart from the first mentioned housing. In such an embodiment the second housing is advantageously disposed within a cavity in the wall that is immediately—or in other embodiments, closely—adjacent to the first housing. Interrogator 7 communicates with one of ports 9 via cable 10 that extends from the rear of the first housing, internally within the wall, and into the second housing. That is, cable 10 is also obscured from view, and difficult to physically access. Preferably, cable 10 is electrically shielded to reduce the risk of wireless intercept of the signals communicated by cable 10.

Processor 8, upon receipt of the request signal from interrogator 7, extracts the necessary identification and/or authorization information from the request signal by extracting and decrypting the relevant packets of information from the communication. This information, together with other control information stored in associated local memory, is used by processor 8 to make the access control decision. That is, processor 8 has available to it, at that point in time, sufficient information to allow the decision to be made without having to refer to another source.

If the access control decision is made by processor 8 to grant access to the user, it generates an authorization signal that contains information indicative of the decision. This authorization signal is packaged as a secure signal that is provided, via one of ports 9 and an electrical cable 11, to an operating device 12 that is spaced apart from reader 5. The secure signal includes, in this embodiment, packages of encrypted information to reduce the risk of unauthorized access to the nature and content of the signal. In further embodiments, all of the secure signal is encrypted. In other embodiments the secure signal is coded securely rather than being encrypted.

The embodiment of FIG. 1 uses triple data encryption (3-DES). That is, encryption based upon three keys, one to encrypt, another read and a third to write. In other embodiments alternative encryption conventions are used. In still further embodiments use is made of encoding such as a proprietary code. However, it is found for access systems that use is more often made of standard encoding, or well known, but secure, encryption methodologies.

In the present embodiment use is made of network cables 6 and 11 to connect the disparate components of system 1. However, in other embodiments the communications between some or all of those components occurs wirelessly.

Device 12 includes a plurality of I/O ports that are collectively designated by reference numeral 13, where one of ports 13 receives the secure signal. A processor 14 is connected with that one of ports 13 for receiving and processing the secure signal. A locking device 15 is connected to processor 14 via another of ports 13.

Processor 14, similar to processor 8, includes at least one CPU, RAM and other memory for storing software and other data, and other hardware for allowing the required functionality to be performed.

The processing of the secure signal by processor 14 requires a decrypting of the signal to extract from that signal data indicative of whether or not the request for access is to be granted. Following this, processor 14 generates a confirmation signal—which also includes one or more securely coded packets of information—that is communicated back to reader 5 (and processor 7) to confirm that the secure signal was received. In some embodiments the confirmation signal is not secure, while in further embodiments the confirmation signal is not provided, or only provided when specifically requested by the reader.

In this embodiment the secure signal does not include any identification information or authorization information for the user who requested access. Rather, it includes only data indicative of whether the decision was to grant access. That is, the secure signal is only generated and communicated to device 12 if the user's request is to be granted. In other embodiments, however, the secure signal includes data indicative of whether or not access is to be granted, and a secure signal is generated for each request for access.

If the processing of the secure signal by processor 14 determines that access is to be granted, the processor provides a lock signal to device 15. In response, device 15 pulses between a locked and an unlocked configuration to allow the user access through the door. Moreover, in this embodiment, processor 14 is responsive to the opening and closing of the door for providing a coded (or encrypted) access signal to reader 5. It will be appreciated by those skilled in the art that at least one door sensor (not shown) is required to support this functionality.

In some embodiments all the communications between reader 5 and operating device 12 are encrypted. That is, any signals generated by processor 14 for communication to processor 8 are encrypted, and must be decrypted upon receipt. In other embodiments, however, only selected ones of the signals communicated between reader 5 and operating device 12 are encrypted.

The signals communicated between the various disparate components of system 1 are configured in accordance with a communications protocol. This typically includes lead bits, end bits, error checking bits, and one or more message packets. It will be appreciated that when reference is made to encryption or encoding of such a signal, that is reference to the encryption or coding of the message packet or packets.

The collective communications between reader 5 and operating device 12 in respect of a given request for access by a user are referred to as a communication session. In this embodiment the encryption used to generate the secure signal is changed for each session. In other embodiments, the encryption is changed after a different number of sessions. In alternative embodiments, the encryption is changed after a random number of sessions, or after an elapsed time period from the last change. The selection of the frequency of change of the encryption will be dependent upon a number of factors including the encryption used, the risk of tampering occurring, the level of security to be implemented at the access point, the particular physical characteristics of the access point and the reader 5.

Locking device 15 includes a fully enclosed solenoid driven bolt (not shown) that toggles between a first configuration and a second configuration. In use, the locking device is installed near the doorway such that, when in the first configuration, the bolt directly engages with the latch of the door to lock the door and close the doorway. In other embodiments, the locking device is spaced from the doorway and mechanically linked to the latch of the door.

The default condition for the door is a closed and locked configuration with respect to the doorway. That is, the default is that access is denied to users and other persons. If, following a request for access, that access is granted, the locking device pulses the lock between the locked and the unlocked configuration to provide the user making the request with a predetermined time to gain the requested access. In other words, in the second configuration—which is typically maintained for only a matter of seconds at any one time—the bolt is retracted from engagement with the latch of the door to allow the door to be opened.

While both reader 5 and operating device 12 are disposed near or adjacent to the same access point—which, as mentioned above, is the door—the two are physically spaced apart and communicate with each other via cable 11. This cable is typically physically secure, in that it extends within the wall and/or an adjacent wall, floor or roof cavity. In other embodiments, cable 11 is contained within a conduit or other casing for further enhancing its physical security. Notwithstanding this physical security, it is not impossible to remotely jam and/or intercept the signals in cable 11, or to induce further signals in that cable. Accordingly, processor 8 generates the secure signal with encoding or encryption, and processor 14 decodes or decrypts the signal to provide a greater level of security.

System 1, as illustrated in FIG. 1, incorporates an embodiment of an authorization system according to the invention. Particularly, this authorization system includes an interface, in the form of interrogator 7, for receiving the request signal indicative of a party—that is, the user—seeking authorization for a predetermined action, where that action is to unlock the door that presently blocks the doorway. More specifically, the action is to progress the locking device to the second configuration referred to above. If that action occurs, the user will be able to progress through the doorway.

Processor 8 is responsive to the request signal for determining if the access is to be granted to that user at that particular time. If access is to be granted, processor 8 generates the secure signal. An operating device, which is collectively defined by ports 13, processor 14 and locking device 15, is physically spaced apart from processor 7 and responsive to the secure signal for initiating the action. That is, the action is to progress the locking device to the second configuration. This, in turn, will allow the user to subsequently gain access through the doorway. The action of progressing the locking device to the second configuration is initiated ultimately by device 15—after processor 14 provides the required signals via one of ports 13—to allow the user to then physically progress through the doorway.

System 1 also includes a request to exit sensor 16 (known as a REX) that is disposed on the opposite side of the door to reader 5 and which is linked to one of ports 9 by an electrical cable 17. In this embodiment sensor 16 is a manually depressed button mechanism (not shown) that is mounted to the opposite side of the wall to interrogator 7. In other embodiments sensor 16 is substituted by a PIR sensor, an automatic RFID sensor, a further reader, an infrared detector, or other motion sensor. Other sensors and switches are known to those skilled in the art.

When a user wishes to progress through the doorway from the sensor side to the reader side, the button of sensor 16 is depressed which results in the generation of a request signal at one of ports 9. In this embodiment the request signal is a low voltage DC signal, although in other embodiments the request signal takes an alternative form. Accordingly, in this instance, port 9 is acting as the interface.

As sensor 16 is located within a secure zone (disposed on the secure side of the doorway) it is presumed that if a user is able to depress the button that they are authorized to exit the secure area via the doorway.

In this embodiment cable 17 is part of a supervised analogue input for port 9. That is, cable 17 includes a plurality of wires that are in combination with a plurality of resistors. This allows the detection of short circuits or open circuits between the wires as well as legitimate triggering of the button. This further provides physical security of cable 17 as it thwarts attempts by unscrupulous parties seeking to gain unauthorized access by short-circuiting or open-circuiting the wires, or applying an external voltage source to the wires to mimic the voltage provided by the button mechanism. In other embodiments use is made of a normal digital input—that is, one that provides only an open circuit or a closed circuit—and not a supervised input as described above.

In the FIG. 1 embodiment the access control decision is made at reader 5, and the reader selectively generates the secure signal that is provided to operating device 12. In other embodiments the access control decision is made at other then the reader. For example, in a specific embodiment host 3 contributes to the making of the access control decision. This includes, following the receipt of a request signal, the establishment of a communication session between reader 5 and host 3. If the results of that session are that access is to be granted, host 3 communicates with reader 5 accordingly. Processor 8 is responsive to that communication to: finalize the determination that access is to be granted; generate the secure signal; and have that signal communicated securely to device 12. While host 3 contributes to the making of the access control decision, the decision itself is not complete until reader 5 generates the secure signal to device 12. In that sense, reader 5—and, in particular, processor 8—is: responsive to the request signal; ultimately determines if the authorization is to be granted; and, if so, generates the secure signal.

Processor 8 includes embedded software that runs upon initialization of reader 5 to determine what components are connected to ports 9. For each of those components that processor 8 determines requires secure communication sessions—be that fully or partially coded or encrypted messages—an additional step occurs. In this embodiment, processor 8 determines that device 12 and host 3 require secure communication sessions. Accordingly, processor 8 generates two coding or encryption keys that are sent to device 12 and host 3 respectively for use by those components for allowing the communication to occur. In this embodiment the keys are generated randomly by processor 8, while in other embodiments the keys are randomly selected from a store of possible keys. In still further embodiments, the selection is based upon other methodologies. It will be appreciated that the information about the keys and their manner of generation by processor 8 is stored in a configuration file for processor 8 which is encrypted.

The above functionality results in each reader, following installation and initialization, being configured for use with a specific I/O component or a specific combination of I/O components. Accordingly, if an attempt is made to connect the reader with a further I/O component the reader will not establish communication with that further component. This prevents unauthorized changes to readers and the components to which they are connected with the result of a more secure access control system. Accordingly, while reader 5 has the potential to communicate with a wide variety of components, that communication is limited to those components that are available at the time of initialization. For example, if there is a desire at a later time to have reader 5 communicate with an additional component it is necessary to have the system administrator intervene to allow such a configuration. This provides for a greater level of quality control in the changes to system 1 and, hence, greater possible levels of security and integrity.

The additional processing power, and hence functionality, at reader 5 also provides other advantages. For example, once all the readers in a multi-reader site have been installed and initialized, a program is executed by host 3 to provide a GUI to a system administrator—or, for example, the engineer or engineers installing the readers—that detects all the installed readers and which gains confirmation of the I/O components connected to those readers. Subsequently, host 3 is able to communicate to respective readers any additional configuration data required. This data is able to be updated centrally, as required. This not only reduces the time for the initial installation, but facilitates quality control and central administrative control and overview during any hardware changes that are subsequently made to the system.

An alternative embodiment of the invention is illustrated in FIG. 2, where corresponding features are denoted by corresponding reference numerals. In particular, host 3 includes a plurality of I/O ports 19, two of which are linked to respective ones of ports 9 and ports 13 by cables 6 and 11. Host 3 also includes a processor 20 that communicates selectively with both processor 8 and processor 14 via the intermediate ports and cables. It will be appreciated that device 12 is disposed at or adjacent to the access point, while host 3 is spaced apart from that access point. In some embodiments, host 3 is contained in a separate building or facility to device 12.

Processor 20, similarly to processor 8, includes at least one CPU, RAM and other memory for storing software and other data, and other hardware for allowing the required functionality to be performed.

Following the presentation of token 4 within the interrogation field provided by reader 5, the token generates a request signal that is used by processor 8 to initiate a communication session with host 3. In effect, the communication between reader 5 and host 3 is between processor 8 and processor 20. Processor 20 is responsive to the communication with processor 8 for making an access control decision. That is, host 3—or more specifically processor 20—determines if the authorization is to be granted. If a positive determination is reached, processor 20 establishes a communication session between host 3 and device 12, and generates a secure signal that is communicated to device 12 during that session. That is, in this embodiment, "the interface" is embodied by reader 5, "the processor" by host 3, and "the operating device" by device 12.

Similarly, if sensor 16 provides a request signal, processor 8 generates a corresponding request signal that is provided to host 3 to initiate an access control decision at processor 20.

In some embodiments processor 8 undertakes some processing of the request signal to modify, manipulate or add to the information contained within that signal. In other embodiments, processor 8 extracts selected information from the request signal, and has that suitably encoded or re-coded and communicated to host 3. That is, processor 8 is able to provide some pre-processing or filtering of the request signal, and need not have that signal communicated unchanged to host 3.

System 1 also includes a further REX sensor 22 for access point 2. Sensor 22 is disposed on the secure side of the access point controlled by reader 5 and is selectively activated by a user to request exit from the secure side of that access point to the other side. Sensor 22, when actuated by the user, provides a request signal directly to host 3. That is, the request signal is conveyed directly to one of ports 19 by cable 23. This is distinct from sensor 16 which provides the respective request signal to one of ports 9. In a further embodiment sensor 16 is omitted.

In other embodiments host 3 includes software controls that are accessible by authorized individuals such as a system administrator for system 1. These controls are used via a GUI (not shown), and allow the administrator to override access control decisions, or to apply special conditions for a given access point or points. For example, when fumigation or other maintenance is scheduled for a given secure area, all the access points are temporarily locked-off for all but a select few users. In these embodiments, the GUI functions as "the interface" and, as such, the host acts as both "the interface" and "the processor".

Reference is now made to FIG. 3 where there is illustrated schematically another embodiment of an authorization system in accordance the invention. Particularly, system 31 includes an interface in the form of a control box 32. The control box receives from an ON/OFF switch 33 that is mounted to the control box a request signal indicative of a party seeking authorization for a predetermined action. In this embodiment the predetermined action is turning a motor (not shown) ON or OFF. A processor 34 is responsive to the request signal for determining if the authorization is to be granted and, if so, generating a secure signal. An operating device 35 is physically spaced apart from processor 34 and responsive to the secure signal for initiating the action.

Control box 32 and device 35 include respective I/O ports 37 and 38, and device 35 includes a processor 39 for receiving the secure signal and subsequently decoding it.

Processors 34 and 39, similarly to the processors referred to above, each include at least one CPU, RAM and other memory for storing software and other data, and other hardware for allowing the required functionality to be performed.

It will be appreciated that control box 32 and device 35 are located in respective spaced apart locations referred to as Location A and Location B and which are defined schematically in the Figure by areas bounded by broken lines. For example, in one embodiment Location B is a factory floor on which the motor is mounted and Location A is a control room that is adjacent to and overlooking the factory floor. In another embodiment Location A is a control station and Location B is a remote pumping station.

Processor 39 operates similarly to processor 14 in that it receives and processes the secure signal to finally determine if the predetermined action is to occur. If the received signal does not comply with the predetermined coding or encryption—that is, if the received signal is believed to be a mimic or other reproduction of an earlier signal—then the action will not occur. Similarly, if the information extracted from the decoded or decrypted signal does not comply with the communication protocol being used, it will also not be acted upon by processor 39. Alternatively, if the secure signal is decoded by processor 39 to reveal a valid instruction, that instruction is followed. In this embodiment, the instruction is to turn the motor OFF if it is ON, and vice versa. Processor 39 provides a command signal to motor controller 40 via port 38. In turn, the controller switches the required transistors (and/or other hardware and/or software) to toggle the motor from one of the ON and the OFF conditions to the other.

Reference is now made to FIG. 4 where there is illustrated schematically a further alternative authorization system according to the invention, where corresponding features are denoted by corresponding reference numerals. In effect, this embodiment integrates operating device 35 of FIG. 3 into the access control system 1 of FIG. 2. In particular, switch 33 is disposed within a secure area—that is, an area that is controlled by system 1. Accordingly, only users with the necessary authorization are allowed within that area at times defined by their respective access rights. Those users, when in the secure area, are able to access switch 33 to turn the motor ON or OFF, as the case may be.

In another embodiment operating device 35 is incorporated into the access control system of FIG. 1.

In a further embodiment all the communications with components in the controlled area are sent directly to host 3, which is also on the secure side of the access point. This minimizes the risk of interception of those communications. For example, in such embodiments, sensor 16 provides a signal to host 3 instead of reader 5. In other embodiments—such as lower security applications or where the physical security of reader 5 is well maintained—both sensor 16 and switch 33 communicate directly with reader 5 and not host 3.

In the FIG. 4 embodiment, it is ultimately processor 20 that makes the final determination on whether or not authorization is to be granted. That is, processor 20—or, in a broader sense, host 3—makes the authorization decision following a request signal. In the case of switch 33, host 3 embodies both "the interface" for receiving the request signal and "the processor" that is responsive to the request signal. In the case of sensor 16, reader 5 embodies "the interface" for receiving the request signal and host 3 embodies "the processor" that is responsive to the request signal.

For the sake of completeness it is mentioned also that when a user presents a token to reader 5 it is again processor 20 that ultimately takes the authorization decision.

The embodiments of the invention demonstrate the benefits of an authorization system utilizing a secure signal for reducing the risk of defeating the system. The embodiments include two processing centres between which is established a secure communication session, at least part of which includes the secure signal. At one of the processing centres the determination is made as to whether or not a request for an action to occur is an authorized request and, if so, the secure signal is compiled and communicated to the other processing centre as part of the secure session. The other processing centre receives the secure signal, decodes that signal, verifies the signal, and then acts accordingly. If the verification is not achieved the signal is not acted upon, but reported back to the first processing centre. If the secure signal is verified, the other processing centre ensures the requested action is initiated.

It will be appreciated by those skilled in the art, on the basis of the teaching herein, that the authorization system of the invention are advantageously incorporated into an access control system to provide synergistic effects. For example, switches are able to be disposed within secure areas to ensure only authorized users are able to actuate those switches at authorized times.

The requirements for a user to be granted authorization to progress through a given access point are typically based upon the time of day, week, year, employment status, accompanying person, and similar characteristics. The embodiments of the invention make use of this authorization functionality not only when applied to access systems, but also more generically to authorization systems. For example, in an embodiment such as the FIG. 4 embodiment, where the switch controls the condition of a motor, one characteristic of a user to have authorization includes that user having a relevant level of recent training in the operation of such equipment. That is, the enrolment information includes a field indicative of such training having been undertaken by the user within a given time period prior to the request. In other embodiments, a switch is only able to be actuated if two or more authorized users are simultaneously present in the secure area. In further embodiments, a switch is only able to be actuated if only one authorized user is present in the secure area. For the last two mentioned embodiments the secure area also includes a REX sensor to which the user must present their respective tokens when requesting to exit the area.

The authorization systems of FIGS. 1, 2 and 4 have been described with reference to access control systems using connected readers. However, in other embodiments, the authorization systems are also applicable to access control systems having one or more remote readers.

As the cost of processing has fallen some control systems—such as access control systems—have attempted to take advantage of this by using a larger number of processors distributed throughout the system. In some instances this also has the advantage of reducing or better managing the network traffic and allowing the application of the access control system to much larger facilities. More particularly, the distributed processors are more able to make access control decisions without having to first refer to the central host and, as such, the network traffic is reduced, or at least managed to prevent delays. In addition, however, it has been appreciated by the inventor that while advantages are able to be obtained from this distribution of processing, it also makes the prior art access control systems more open to defeat as one or more of the processors are disposed in far less secure areas than was previously the case.

The preferred embodiments of this invention also take advantage of the reduction in cost of processing by having processors at the readers. These embodiments do not, however, suffer from the same disadvantages of the prior art as use is also made of processors at the operating devices for allowing secure signals to be communicated between the reader/host and the operating device.

In the different embodiments there is typically at least one processor disposed within a relatively un-secure zone. For example, in FIG. 1 reader 5 and processor 8 are disposed on the entrance side—that is, the un-secure side—of the access point. Operating device 12 and processor 14 are disposed on the secure side of that access point. Accordingly, a communication session between processors 8 and 14 involves signals being sent through a relatively un-secure zone. To reduce the risk of defeat, the communication session between processors 8 and 14 is a secure session.

Similar comments apply to FIG. 3, where Location A is a secure zone, and Location B is an un-secure zone. Accordingly, a communication session between processors 34 and 39 requires the signals comprising that session to be passed through an un-secure zone.

The inclusion of a processor within the operating device is to allow the use of secure communications between the operating device and the reader/host. However, it has been found that having that processor at the operating device also allows other functionalities to be provided. For example: reporting to the reader/host any alarm conditions at the operating device; providing confirmation signals once actions have been initiated by the operating device; and allowing the operating device to interface with REX sensors or other inputs. The latter feature more usually requires the operating device to communicate any request to the reader/host to allow the access control decision to be made. However, in other embodiments, the processor at the operating device makes the access control decision.

The major advantages of the preferred embodiments include:
Providing a greater level of protection against unauthorized users gaining access to controlled assets.
Allowing advantage to be gained from distributed processing within an authorization system and, hence, for the application of the invention to large-scale implementations of authorization systems.
Not requiring processors to be disposed within secure zones.
Allowing authorization to be more readily available to LAN and WAN applications.
Allowing authorization to be more readily available to wireless applications.

While the communications between components in the access control systems described above has generally been with reference to physical cables, it will be appreciated that in other embodiments use is made of wireless communications instead of or in addition to physical cables. For example, in some embodiments one or more readers include a wireless only link to host 3, while in other embodiments one or more readers include both a physical link and a wireless link to host 3, where the wireless link is only activated in the event the physical link is either busy or inoperative. In other embodiments, one or more readers communicate wirelessly either entirely or in part with components other than host 3. This allows for less restriction on the location of the various hardware components, while still enabling data and/or firmware to be transferred to the readers, as required.

In the FIG. 1 embodiment cable 6 is standard twisted-pair cable in an Ethernet network defined primarily by host 3. This cable makes use of Power of Ethernet technology, and transmits electrical power, together with data, to reader 5 from host 3. This also allows for less design restriction in the placement of reader 5, as there is no longer a need for a separate power supply for reader 5.

Although the invention has been described with reference to specific examples it will be appreciated by those skilled in the art that it may be embodied in many other forms.

The invention claimed is:

1. An authorization system including:
an interface for receiving a request signal indicative of a party seeking authorization for a predetermined action, wherein the request signal is received as an RF signal;
an access authorization device containing a first processor, the first processor being configured to receive the request signal and, based on processing of the request signal, determine if the authorization is to be granted and, if so, generate an authorization signal that includes information that is securely coded and which is indicative of the determination, wherein the authorization signal is communicated via wired communication to an actuator device; and
an actuator device that is physically separate from and physically spaced apart from the access authorization device, the actuator device being configured to receive the authorization signal from the access authorization device via the wired communication, the actuator device having a second processor that is configured to process the authorization signal and decode the securely coded information, and wherein the actuator device is configured to initiate the predetermined action in response to the decoding of the securely coded information.

2. The authorization system according to claim 1, wherein the access authorization device generates an authorization signal in response to each request signal.

3. The authorization system according to claim 2, wherein the information of the authorization signal is encrypted.

4. The authorization system according to claim 3, wherein the authorization signal itself is encrypted.

5. The authorization system according to claim 1, wherein the request signal is not encrypted.

6. The authorization system according to claim 5, wherein the request signal includes identification and authorization information that is encrypted.

7. The authorization system according to claim 1, wherein the request signal is encrypted.

8. The authorization system according to claim 1, wherein the interface is a wireless interface.

9. The authorization system according to claim 1, wherein the interface is a wired interface.

10. The authorization system according to claim 1, wherein the access authorization device is in communication with a host.

11. The authorization system according to claim 1, wherein the authorization signal is part of a communication session between the access authorization device and the actuator device.

12. The authorization system according to claim 11, wherein the communications session is subject to a predetermined coding of the information.

13. The authorization system according to claim 12, wherein different communications sessions use different predetermined coding of the information.

14. The authorization A system according to claim 1, wherein if the authorization is not to be granted, the access authorization device does not generate the authorization signal.

15. The authorization system according to claim 1, wherein if the authorization is not to be granted, the access authorization device generates the authorization signal to include information that is securely coded and which is indicative of the determination, and the actuator device, upon decoding the information, does one or more of:
   not initiating the action; and
   generating an alarm signal.

16. A method of authorization, the method including:
   receiving a request signal indicative of a party seeking authorization for a predetermined action, wherein the request signal is received as an RF signal;
   operating a access authorization device having a first processor to process the request signal, thereby to determine if the authorization is to be granted and, if so, generate an authorization signal that includes information that is securely coded and which is indicative of the determination, wherein the authorization signal is communicated via wired communication to an actuator device; and
   operating a actuator device to receive the authorization signal via the wired communication, the actuator device being physically separate and spaced apart from the access authorization device, the actuator device having a second processor that is configured to process the authorization signal thereby to decode the securely coded information, and wherein the actuator device is configured to initiate the predetermined action in response to the decoding of the securely coded information.

17. The method of claim 16, wherein the authorization signal is encrypted.

18. The method of claim 16, wherein the information of the authorization signal is encrypted, but the authorization signal itself is not encrypted.

19. An authorization system including:
   an interface for receiving a request signal indicative of a party seeking authorization for a predetermined action, wherein the request signal is received as an RF signal;
   an access authorization device that is configured to receive the request signal and configured to process the request signal thereby to determine if the authorization is to be granted and, if so, generate a secure signal with the use of an encryption key, wherein the secure signal is communicated via wired communication to an actuator device; and
   an actuator device being physically separate from and spaced apart from the access authorization device, the actuator device being configured to receive the secure signal via the wired communication, and decrypt and process the secure signal thereby to selectively initiate the action.

20. The authorization system according to claim 19 wherein:
   the interface and the party are disposed within a first zone;
   the access authorization device is in or adjacent to the first zone and is responsive to the request signal for determining if the authorization is to be granted and, or so, generating the secure signal; and
   the actuator device is disposed in a second zone that is physically distinct from the first zone.

* * * * *